June 12, 1928.

C. J. LAWSON 1,673,690

LIQUID MEASURING DEVICE

Filed July 21, 1926   2 Sheets-Sheet 1

Inventor
Charles Lawson
By Mason Fenwick & Lawrence,
Attorneys

June 12, 1928.
C. J. LAWSON
1,673,690
LIQUID MEASURING DEVICE
Filed July 21, 1926 2 Sheets-Sheet 2
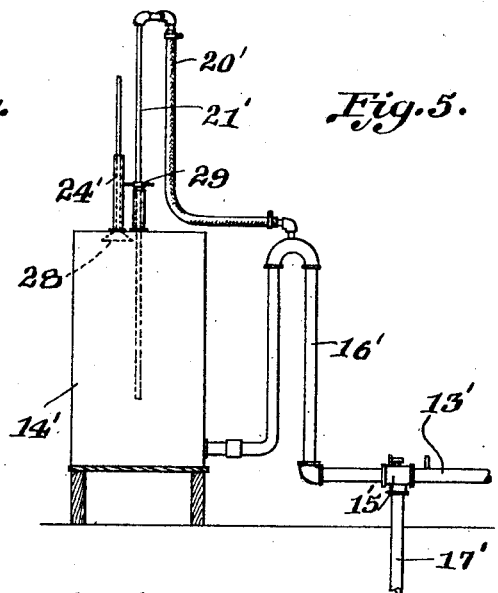
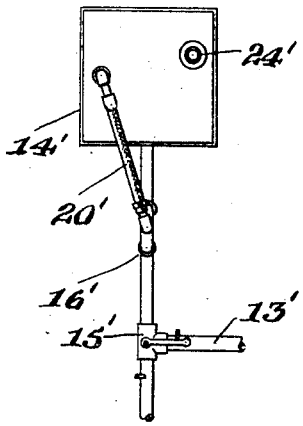
Inventor
Charles Lawson
By Mason Fenwick Lawrence,
Attorneys Patented June 12, 1928.

1,673,690

UNITED STATES PATENT OFFICE.

CHARLES J. LAWSON, OF GREENVILLE, MISSISSIPPI.

LIQUID-MEASURING DEVICE.

Application filed July 21, 1926. Serial No. 124,081.

This invention relates to siphon measuring tanks and more particularly to an air break water gage for accurately controlling the quantity of liquid withdrawn from such tanks.

The invention is applicable to many uses and is particularly useful in connection with concrete mixers where accuracy of water charge is paramount.

The principal object of the invention is to increase the accuracy, rapidity and simplicity of operation of devices of this character.

A more complete understanding of the invention may be had by reference to the accompanying drawings illustrative of the invention, in which:

Figure 4 is a side view of a modified arrangement in which the supply tank is dispensed with;

Figure 5 is an end view of the arrangement shown in Figure 4; and

Figure 6 is a plan view of the modification shown in Figures 4 and 5.

Figure 1:
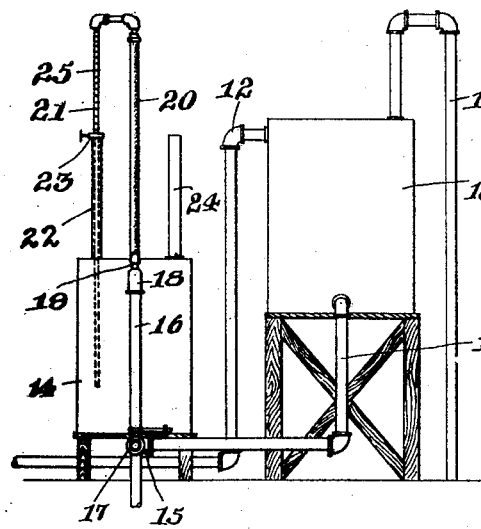
Figure 1 is a side view of a preferred form of my invention, in which a supply tank is employed for furnishing liquid to the measuring or gage tank.
Figure 2:
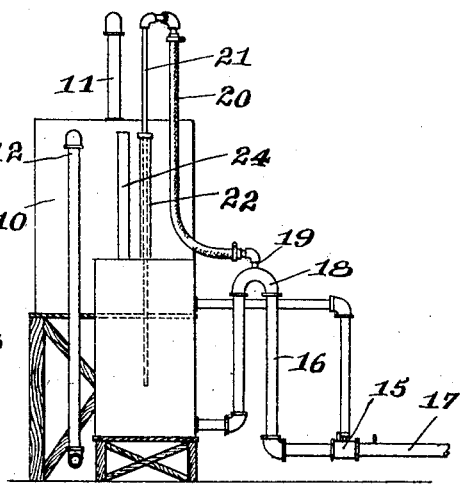
Figure 2 is an end view of the device shown in Figure 1.
Figure 3:
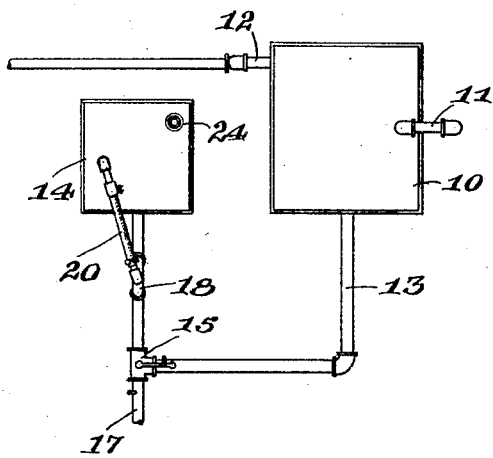
Figure 3 is a plan view of the same.

Referring first to Figures 1 to 3, the reference numeral 10 denotes a suitable closed supply tank, of the desired dimensions, having an inlet pipe 11 leading from a power pump or the like and communicating with the supply tank at the top. An overflow pipe 12 is likewise provided at the upper portion of the tank and leads to a suitable main or other discharge point. From the bottom of the supply tank 10 a pipe 13 leads to a tank 14, hereinafter known as the gage tank. A three-way valve 15 is located between the tanks 10 and 14, and also a vertical U-shaped siphon 16. The three-way valve 15 controls the flow from the supply tank 10 to the gage tank 14 or from the gage tank 14 to an off-take 17 according to the position of the valve.

The U-shaped siphon 16 is one of the features of the present invention and will be described in detail. It is located so as to check the flow of liquid from the gage tank to the mixer or other place of use, and to insure a regulated and evenly flowing supply. The bend or top portion 18 of the siphon is provided with a nipple 19, by means of which air may be admitted to the siphon when the water in the gage tank 14 has reached a predetermined level, thereby breaking the siphon action and discontinuing the flow of fluid from the tank. The means for accomplishing this result is an important feature of the invention. As shown, a hose pipe 20 or other flexible tubing connects the nipple 19 to a suitable graduated air pipe 21, preferably of brass, copper or other metal which does not easily corrode. The pipe 21 constitutes a gage, and may be graduated with any suitable marking 25, to indicate gallons, quarts or any suitable units of measure. This gage 21 extends through a guide pipe 22 and into the gage tank 14. The gage may be lowered to any desired level and clamped in the adjusted position by means of a suitable clip 23.

When tank 14 is filled with liquid, atmospheric pressure exists only at the mouth of tube 24. At all points below this, the pressure is atmospheric plus the head of water. In operation, the tank 14 is filled with liquid from the supply tank 10 to a level above the bend 18 in the siphon 16, the three-way valve 15 being turned so as to admit the liquid from the supply tank, and to cut off the pipe 17 leading to the mixer or other place of use. The height of pipes 22 and 24 should be above the level of water in the supply tank 10 in order to provide for automatically stopping the flow of water from the supply tank when the level of water in these pipes equals that in the supply tank.

The gage pipe 21 is now adjusted to indicate the amount of water which is to be drawn off from the gage tank and is clamped in position by means of the clip 23. The amount of water indicated on the gage may now be withdrawn from the gage tank 14 by merely turning the three-way valve 15 so as to cut off the supply from tank 10 and connect the siphon 16 with the offtake 17 leading to the concrete mixer or other place of use. The level of the water in tank 14 being above the bend 18 in the siphon, water will at once flow from the tank through the siphon 16 and offtake pipe 17. As the water level is lowered a partial vacuum is created in the air gage pipe 21 and hose 20, communicating with the top of the siphon 18 and the siphon action continues as long as this partial vacuum is maintained. The water will thus continue to flow through the pipe 17 so long as the lower end of the air pipe 21 is below the level of the water in the gage tank 14. As soon, however, as the water level falls below the end of the gage pipe 21, air is admitted and atmospheric pressure transmitted to the top of the siphon through nipple 19, thus breaking the siphon action and discontinuing the flow of water.

The tank 14 may now be refilled as before, and any desired amount of liquid may be withdrawn by suitable adjustment of the gage 21.

If desired the supply tank 10 may be eliminated, as shown in Figures 4, 5 and 6. The arrangement of parts in this modification is similar to that previously described except that water is supplied to the gage tank 14' through a suitable pipe 13' which may be connected with a hydrant or other direct pressure. A three-way valve 15' is provided, as before, to connect siphon 16' to the pipe 13' or offtake pipe 17' as desired.

Where the supply tank is not used it is necessary to provide means to prevent overfilling of the gage tank, and to this end the vent pipe 24' is provided with a float valve 28, which automatically closes the vent when the tank is full, and prevents overflowing, but which falls and admits air as soon as the water level drops slightly. It is also necessary to provide a tight fitting packing gland 29 at the top of the guide pipe 22' to prevent the escape of water at this point. The hose 20' and gage 21' are the same as in Figures 1–3. No clip is necessary to secure adjustment of the gage 21' as the fit is sufficiently tight to hold the gage in adjusted position. The operation of the modified construction is substantially the same as where the supply tank is present.

The invention has been described in considerable detail for the purpose of illustration, but it will be understood that these may be varied without departing from the spirit of the invention.

It will be noted that the leg of the siphon 16 next to the three way valve 15 is longer than the leg next to the tank side.

It will also be apparent that the supply tank 10 need not be closed at the top though it is so shown and described herein.

Having described my invention, what I claim as new is:

1. In a device of the character described, in combination, a gage tank adapted to contain liquid, a U-shaped siphon for discharging liquid from said tank, the top bend of the U being below the top of gage tank, a graduated air pipe extending through the top of said tank, means for vertically adjusting said gage pipe with reference to the level of the liquid in the tank, and flexible means for connecting said gage pipe to the top of the siphon, whereby air is admitted to the siphon when the level of the liquid in said gage tank falls below the lower end of the gage pipe.

2. In a device of the character described, a liquid containing gage tank, a siphon leading from the tank for supplying liquid to or discharging liquid from the tank, the liquid supply tank, a discharge pipe, means for selectively connecting the siphon with a supply tank or with the discharge pipe, the selected means comprising a manually operated three-way valve whereby the gage tank may be alternately filled and discharged by the operation of the three-way valve, and means for automatically breaking the siphon action during the discharge of the gage tank when the liquid in the tank has reached a predetermined level, the automatic means for breaking the siphon action during the discharge from the gage tank comprising a graduated pipe extending through the top of the gage tank and adjustable with reference to the tank, the lower end of the pipe extending beneath the liquid in the gage tank when the tank is full, the upper end of the gage pipe being connected by flexible tubing to the top of the siphon.

3. A tank, an inverted U-shaped siphon connected to the tank, valve mechanism connected to said siphon to control the supply and discharge of liquid through said siphon to and from said tank, a valve controlled air vent extending from said tank, a tube extending into said tank and adjustable thereon to position one of its ends in said tank at any desired elevation therein, and a pipe outside said tank connecting the other end of said tube to the bend of said siphon.

In testimony whereof I affix my signature.

CHARLES J. LAWSON.